United States Patent [19]
Utley, Jr.

[11] Patent Number: 5,921,497
[45] Date of Patent: Jul. 13, 1999

[54] CABLE ROTARY JOINT

[75] Inventor: Stephen Field Utley, Jr., Upper Montclair, N.J.

[73] Assignee: Lucent Technologies Inc., Murray Hill, N.J.

[21] Appl. No.: 08/994,973

[22] Filed: Dec. 19, 1997

[51] Int. Cl.[6] .............................. B65H 75/38; G02B 6/26
[52] U.S. Cl. ........................................ 242/388.6; 385/26
[58] Field of Search ............................. 242/388.6; 385/26

[56] References Cited

U.S. PATENT DOCUMENTS

| | | | |
|---|---|---|---|
| 3,120,355 | 2/1964 | Bowman | 242/388.6 |
| 3,822,834 | 7/1974 | Fjarlie | 242/54 R |
| 5,078,466 | 1/1992 | MacCulloch | 385/26 |
| 5,450,509 | 9/1995 | Davis | 385/26 |

OTHER PUBLICATIONS

Product Descripton—Cable Winding Sidewinder System, Indal Technologies Inc. (Jun. 22, 1993).
Sidewinder—For ROVs, VDS, And Towed Arrays, Sea Technology, Jul. 1992, p. 27, et seq.

*Primary Examiner*—John Q. Nguyen

[57] ABSTRACT

A cable rotary joint includes a spool support and a stator spool mounted on the support and having a spool axis. The stator spool holds one portion of a cable segment having a first cable end and a second cable end, and allows the first cable end to connect with a stationary cable interface in a downstream direction from the stator spool. A rotor spool mounted for rotational movement about the spool axis holds a remaining portion of the cable segment, and allows the second cable end to connect with a rotating cable interface in an upstream direction from the rotor spool. The cable segment may be a ribboned fiber-optic cable, to meet applications in which any fiber-optic core cable is deployed from a ship. A tension wind assembly between the stator and the rotor spools includes a pulley set for transporting the cable segment from one of the spools to the other in response to rotation of the rotor spool. The pulley set has a pair of lead pulleys each supported adjacent a circumference of an associated spool to lead the cable segment on or off the associated spool, and a reversing pulley arranged in relation to the lead pulleys to transfer the cable segment between them while exerting a tensioning force tending to keep the cable segment engaged with the pulley set.

10 Claims, 6 Drawing Sheets

CABLE ROTARY JOINT

BACKGROUND OF THE INVENTION

1. Field of the Invention

The present invention relates to cable rotary joints, and particularly to an arrangement in which a length of wire or fiber-optic cable is transferred between a pair of spools to effect a number of rotations between opposite ends of the cable.

2. Discussion of the Known Art

Certain telemetry and data link systems must ensure continuity of signals across a rotating interface. A rotating interface is presented, for example, by a stationary receiver on the deck of a ship, and an instrumentation unit that is towed at the end of an electrical or fiber optic cable. The instrument side of the cable is reeled up and down by a winched cable storage drum on the ship's deck. The receiver side of the cable exits from a hub region of the drum, and therefore rotates or twists in unison with rotation of the drum.

Thus, in order for the instrumentation unit to maintain a continuous and unbroken connection with the receiver via the cable while the cable drum rotates many revolutions in either sense of rotation, an interface tolerant of cable rotation must be provided between the rotating end of the cable exiting from the drum, and the stationary receiver on the ship's deck. One such interface is disclosed in U.S. Pat. No. 3,822,834 (Jul. 9, 1974). The device of the '834 patent is designed to transfer electrical and hydraulic cables, pneumatic hoses, and other sturdy lines capable of being level-wound in many layers without damage by large scale reels.

With the recent application of optical fiber to cabled telemetry systems, optical "rotors" have been developed which provide acceptable optical continuity of a limited number of fibers across rotating joints of unlimited revolutions, in either sense of rotation. Most known fiber optic rotors rely on various techniques of optically jumping a gap between a stationary and a rotating side of the joint, the most straightforward involving optically jumping a gap between two opposing lensed fiber ends which are precisely aligned on the axis of rotation.

U.S. Pat. Nos. 5,078,466 (Jun. 7, 1992) and 5,450,509 (Sep. 12, 1995) disclose optical rotary joints that spool a stiffened ribboned fiber matrix off of the outside of an inner cylindrical surface, and onto the inside of a coaxial outer cylindrical surface. Both of the patented devices require a large ribboned fiber that is adhered to a stiffening material to maintain winding control. Both devices are thus limited in the number of cable rotations available per a given housing volume.

SUMMARY OF THE INVENTION

According to the invention, a cable rotary joint includes a spool support, and a stator spool mounted on the support and arranged to hold a first portion of a cable segment having a first cable end and a second cable end, and to allow the first cable end to connect with a stationary cable interface downstream of the stator spool. A rotor spool mounted for rotational movement about a spool axis holds a second portion of the cable segment, and allows the second cable end to connect with a rotating cable interface upstream from the rotor spool. A tension wind assembly between the stator and the rotor spools includes a pulley set for transporting the cable segment from one of the spools to the other in response to rotation of the rotor spool. The pulley set includes a pair of lead pulleys each supported near a circumference of a corresponding spool for leading the cable segment on or off the spool, and a reversing pulley arranged cooperatively with the lead pulleys to transfer the cable segment between the lead pulleys. A torque mechanism coupled to the pulley set urges the reversing pulley to exert a tension force on the cable segment tending to maintain the segment in engagement with the pulley set, while the segment is transported by the pulley set between the spools of the rotary joint.

For a better understanding of the invention, reference is made to the following description taken in conjunction with the accompanying drawing, and the scope of the invention will be pointed out in the appended claims.

DETAILED DESCRIPTION OF THE INVENTION

Figure 1:
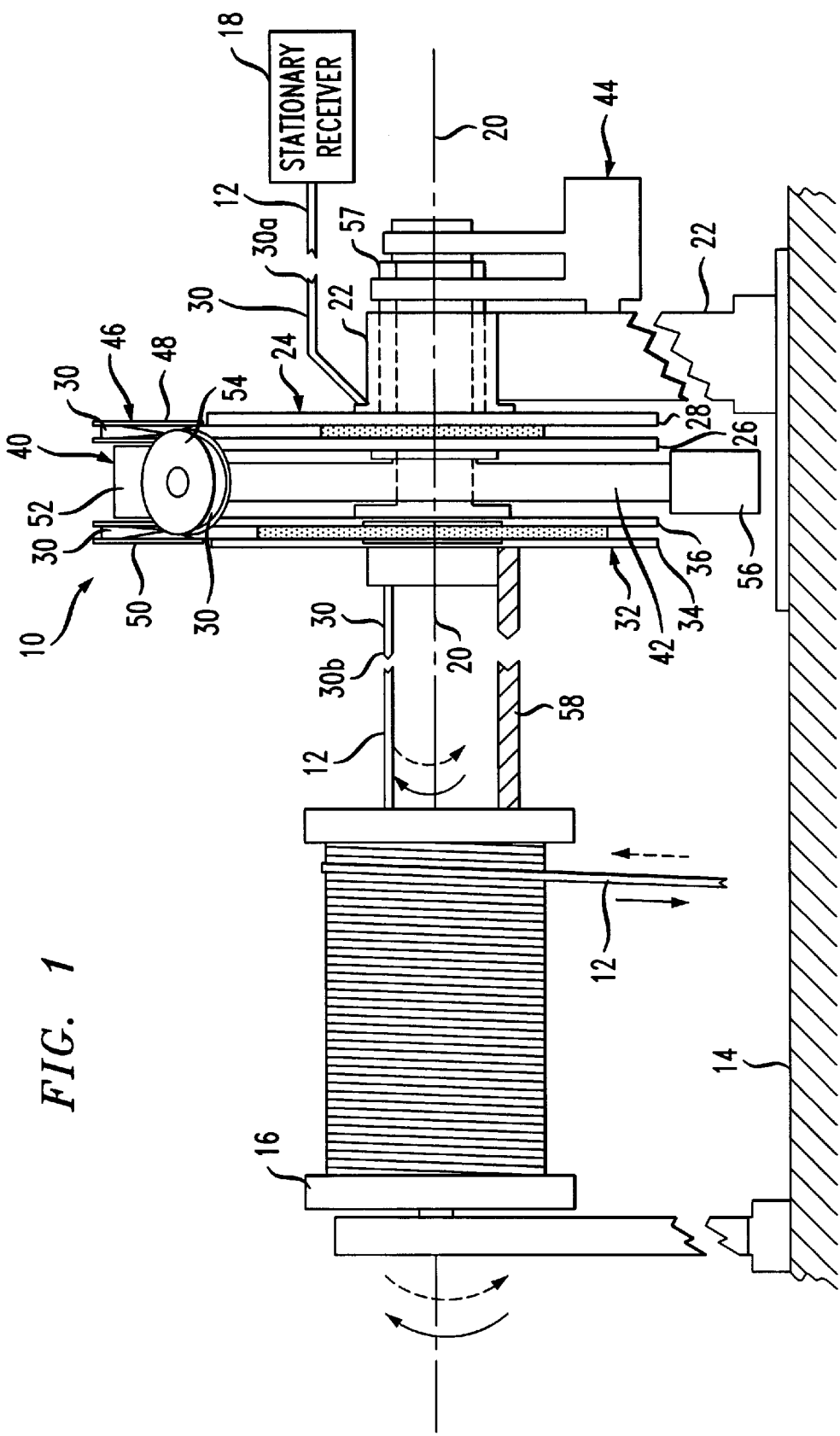
FIG. 1 is side elevation view of a cable rotary joint according to the invention, in connection with a fibre-optic ribbon cable storage drum.

FIG. 1 is a side elevation view of a cable rotary joint 10 according to the invention. In the illustrated embodiment, the joint 10 operates to pass any fiber-optic core cable 12 across a rotation interface for a significant number of cable rotations. The cable 12 may comprise a relatively large number (e.g., 12 or 18) of low loss, single or multi-mode optical fibers.

In a typical application, the cable 12 is deployed or paid out into water from a deck 14 of a ship, by unwinding the cable 12 from a storage drum 16 which drum 16 rotates, e.g., clockwise as viewed from the left in FIG. 1. Cable 12 exits from a hub region of the drum 16 for connection with a stationary receiver 18 that is fixed relative to the ship's deck 14. It thus can be seen that the cable 12 near the hub of the drum 16 will itself rotate about an axis 20 of the drum 16 upon drum rotation. The cable 12 is reeled in by rotating the drum 16, e.g., counter-clockwise as viewed from the left thus causing the cable on the receiver side of the drum 16 also to rotate counter-clockwise about the axis 20. The present rotary joint 10 provides a transition for the cable 12 enabling it to connect between the rotating storage drum 16 and the stationary receiver 18 without damaging or unduly stressing the cable, despite many revolutions of the cable drum 16 in either sense of rotation.

The rotary joint 10 comprises a spool support 22 a base of which is fixed on the deck 14. A stator spool 24 is fixed to the spool support 22, with a spool axis of the stator spool 24 coincident with the drum axis 20. The stator spool 24 has a pair of flanges 26, 28 spaced preferably to accommodate only a single width of a ribbon fiber-optic cable segment 30 having at least the same number of optical fibers as the cable 12. The diameter of the spool hub and the flanges 26, 28 is sufficient to hold a determined length of the ribbon cable segment 30 when wound on the spool 24 in a single width. A typical ribbon cable width of the segment 30 is about 0.125 inches with a thickness of about 0.0125 inches. These dimensions increase slightly for ruggedized cable versions.

A rotor spool 32 is mounted on the spool support 22 for rotational movement about the spool/drum axis 20. Thus, the rotor spool 32 is mounted coaxially with the stator spool 24 at a certain axial distance from the stator spool 24 toward the cable storage drum 16. The rotor spool has a pair of flanges 34, 36 that are also spaced and dimensioned to hold a single width of the ribbon cable segment 30.

A determined length of the ribbon cable segment 30 is wound initially on either the stator spool 24 or the rotor spool 32. A first cable end 30a exiting from the hub of the stator spool 24, is provided for connection with the stationary cable 12 of the receiver 18 downstream of the stator spool 24. A second cable end 30b of the segment 30 is provided at the hub of the rotor spool 32 for connection with the rotating cable 12 of the storage drum 16, upstream of the rotor spool 32. It will be understood by those skilled in the art that the length of the ribbon cable segment 30 is a function of the number of rotations to be accommodated by the joint 10, and the dimensions of the stator and the rotor spools 24, 32.

A tension wind assembly 40 is located between the spools 24, 32. The assembly comprises a tension arm 42 which is mounted on the spool support 22 for rotational movement about the spool axis 20. A tension wind mechanism 44 at the right end of the spool support 22 in FIG. 1 operates to transmit a constant torque to the tension arm 42, using a conventional technique or one which is described in connection with FIG. 4. Accordingly, during operation of the rotary joint 10, the tension arm 42 is constantly urged in, e.g., the clockwise direction as viewed from the left in FIG. 1. The torque transmitted by the mechanism 44 counters a torque applied to the arm 42 by the cable segment 30, as explained below.

The tension wind assembly 40 also includes a pulley set 46. The pulley set 46 is fixed at one end of the tension arm 42 and includes a pair of lead pulleys 48, 50 each of which is supported adjacent a circumference of a corresponding one of the stator and the rotor spools 24, 32. Each of the lead pulleys 48, 50 is preferably pivoted on a body 52 of the pulley set 46, for rotation about an axis parallel to the spool axis 20. Each of the lead pulleys 48, 50 is maintained in the same radial position near the circumference of each of the spool flanges 26, 28; and 34, 36; regardless of the angular position of the tension arm 42 relative to the spool axis 20.

Figure 2:
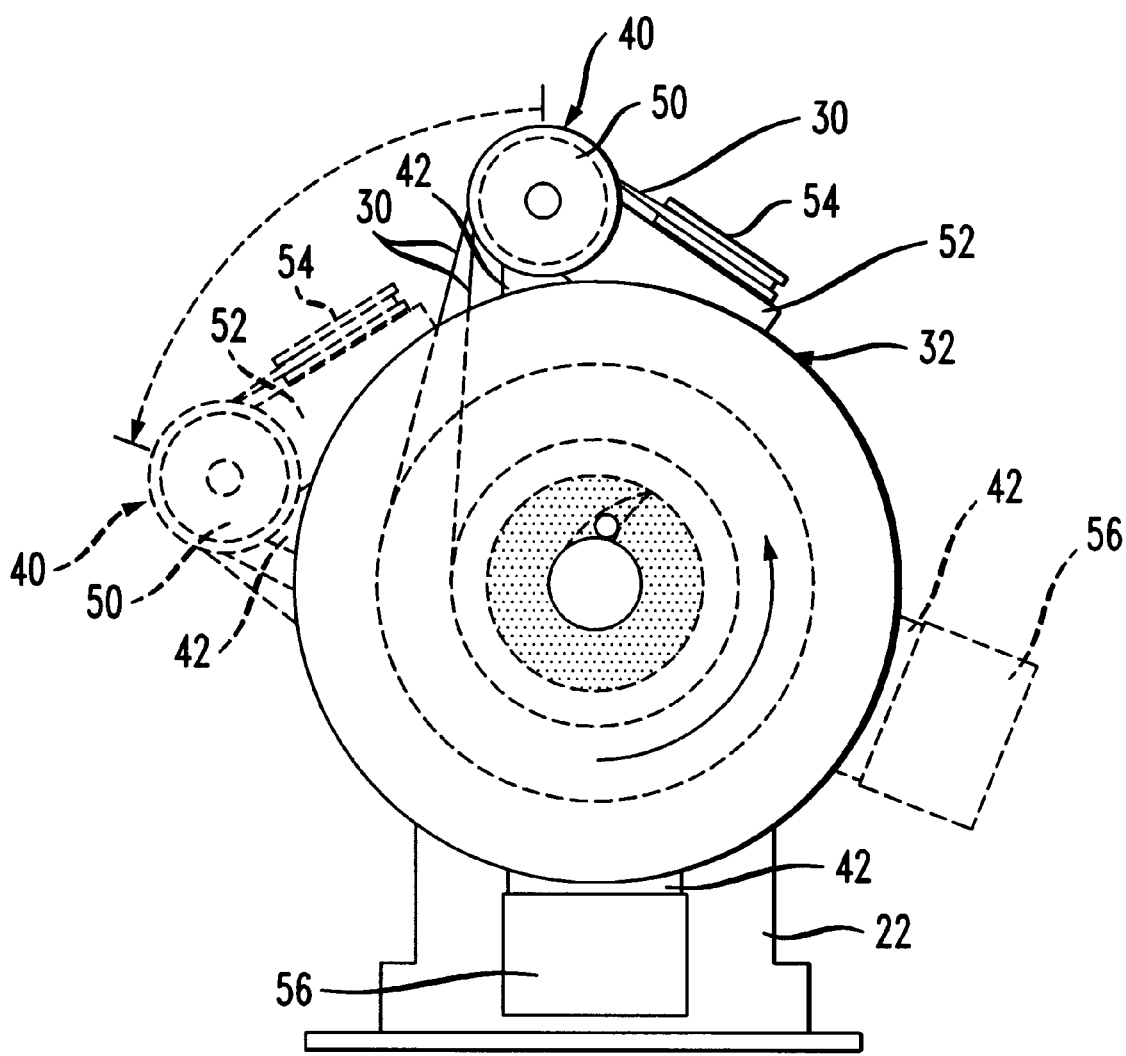
FIG. 2 is a front elevation view of the rotary joint in FIG. 1.

A reversing pulley 54 is preferably pivoted on the pulley set body 52 for rotation about an axis in a plane perpendicular to the spool axis 20. The reversing pulley 54 is located in relation with the lead pulleys 48, 50 so as to transfer the cable segment 30 in either direction between the lead pulleys 48, 50. To counter a moment arm created by the pulley set 46 at one end of the tension arm 42, the tension wind assembly 40 preferably has a counterweight 56 diametrically opposite the pulley set on the tension arm 42. The counterweight 56 is configured so as not to interfere with the stator and the rotor spools 24, 32 as the counterweight 56 rotates with the tension arm 42 about the spool axis 20. See FIG. 2.

The tension wind mechanism 44 transmits torque to the reversing pulley 54 through, e.g., a rotatable hollow shaft 57 mounted for rotation on the spool support 22 and coaxial with the spool axis 20. The tension arm 42 is fixed on the hollow shaft 57. In the illustrated embodiment, torque from the tension wind mechanism 44 operates to urge the reversing pulley 54 of the pulley set 46 in a clockwise direction as viewed from the left in FIG. 1. The ribbon cable segment 30 is led either to wind on or to unwind off an associated spool by the lead pulleys 48, 50, and the cable segment 30 is looped on the circumference of the reversing pulley 54. Thus, the torque applied by the mechanism 44 exerts a tensioning force on the cable segment 30 via the reversing pulley 54. The tensioning force tends to maintain the ribbon cable segment 30 in engagement with each of the pulleys of the pulley set 46, while the cable segment 30 is transported by the pulley set between the spools 24, 32 of the rotary joint 10.

Specifically, cable segment 30 is transported between the rotor joint pulleys 24, 32 in response to rotation of the rotor spool 32. The spool 32 is preferably mechanically linked by, e.g., a cylindrical hollow conduit 58 with the storage drum 16. Thus, in the arrangement of FIG. 1, the rotor spool 32 is locked for rotation with the drum 16 in either sense of rotation. The rotating fiber-optic cable 12 exiting from the drum 16, and the second cable end 30b of the ribbon cable segment 30, can connect directly with one another, for example, inside the conduit 58.

Figure 3:
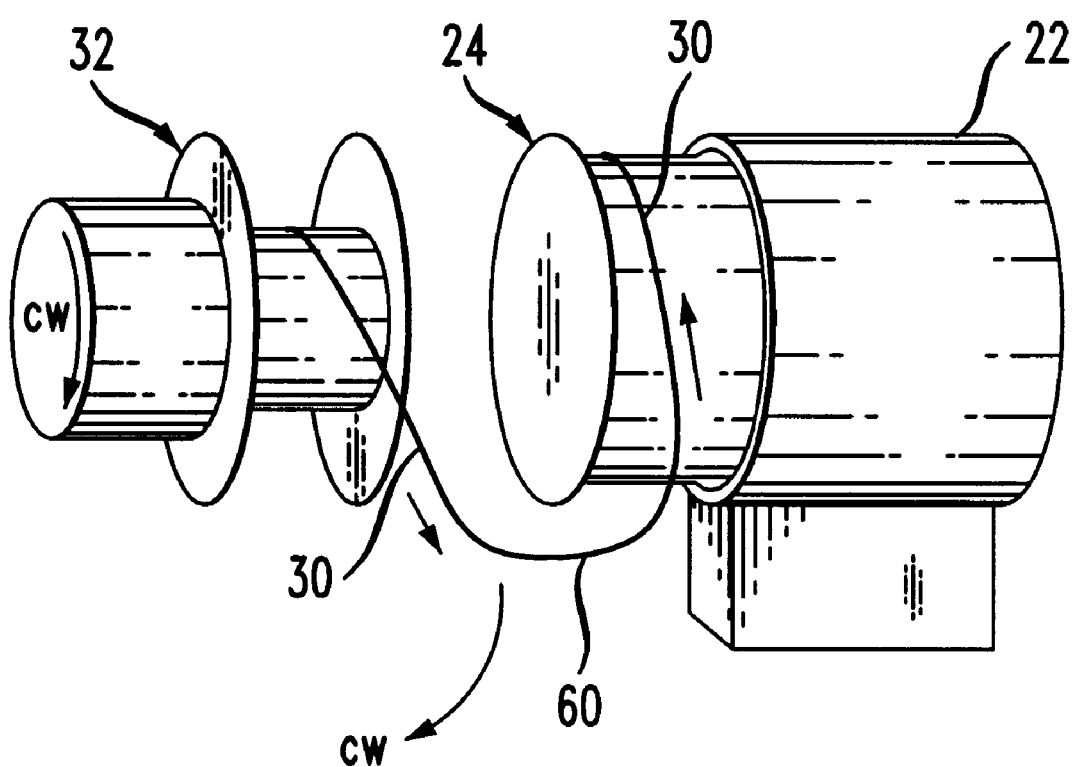
FIG. 3 is an illustration of cable winding motion when a cable segment is transferred between spools of the rotary joint in FIG. 1.

FIG. 3 illustrates winding and unwinding motion of the cable segment 30 with respect to the stator and the rotor spools 24, 32, in response to rotation of the rotor spool 32. The present cable rotary joint makes use of a winding dynamic that may be called "opposite sense" spool-to-spool transfer. The total number of end-to-end cable rotations allowed by the present joint 10 is twice the number of layers or turns of the cable segment 30 when fully wound on one of the two spools 24, 32.

As seen in FIG. 3, if rotor spool 32 rotates clockwise, a first portion of the cable segment 30 that is wound on the stator spool 22 in a clockwise direction, is further wound on the stator spool 24 while a second portion of the cable segment 30 is un-wound in a counter-clockwise direction from the rotor spool 32. A loop 60 of the cable segment 30 between the spools 24, 32 is caused to follow a circular path in a clockwise direction near the circumference of the spool flanges while the segment 30 is being transferred. The tension wind assembly 40 including the pulley set 46 in FIG. 1, manages to maintain a constant tension in the ribbon cable segment 30 as its loop 60 follows a rotational path about the circumference of the spools 24, 32.

It can also be seen from FIG. 3 that if the rotor spool 32 is turned counter-clockwise while the torque tending to rotate the loop 60 in the clockwise direction is maintained on the loop, a portion of the cable segment 30 transported by the pulley set 46 (FIG. 1) is wound in a clockwise sense on the rotor spool 32 while being unwound in a counter-clockwise sense from the stator spool 24.

Figure 4:
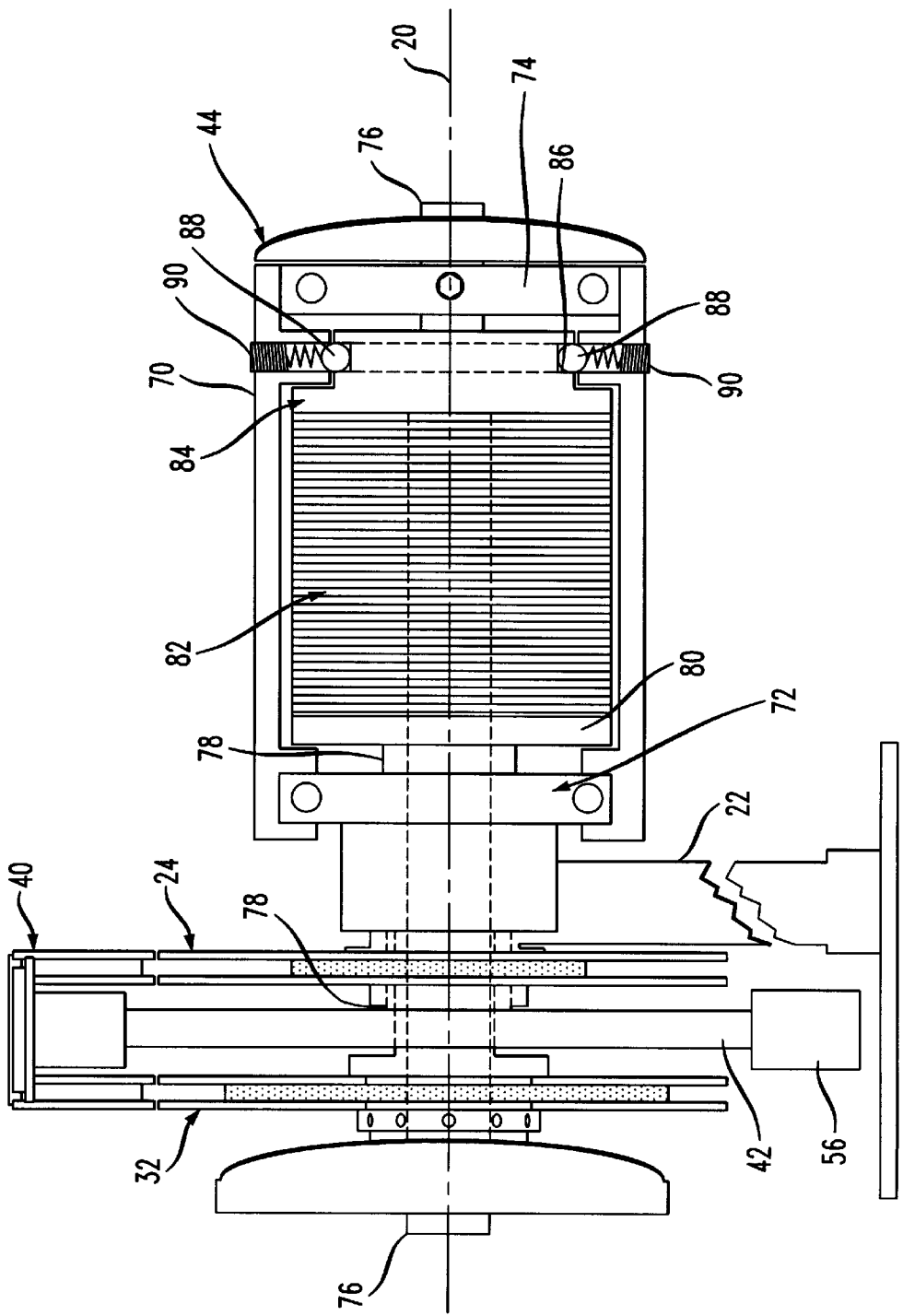
FIG. 4 is a side view in section of a cable segment tensioning mechanism for use with the rotary joint in FIG. 1.

FIG. 4 is a side view of a constant torque mechanism that can be used as the mechanism 44 in FIG. 1. The mechanism includes a cylindrical shell housing 70 that is supported coaxially about the spool axis 20 by a pair of over-running disk clutches 72, 74 at opposite axial ends of the housing 70. Clutch 72 is fixed on the spool support 22, and clutch 74 is fixed on a hollow shaft 76 which extends axially through the housing 70 and the spool support 22, to engage the hub of the rotor spool 32.

The tension arm 42 is fixed for rotation on a hollow shaft 78 that surrounds the rotor shaft 76. Shaft 78 terminates in an end flange 80 inside the housing 70 near the clutch 72. A coil spring 82 has one coil end fixed coaxially to the end flange 80. An opposite coil end of the spring 82 is fixed coaxially to an over-torque relief rotor 84. Rotor 84 has, e.g., six circumferentially-spaced flats formed in its periphery to define a circumferential channel 86 in the rotor 84. A pair of ball bearings 88 are urged from the inner periphery of the housing 70 into the channel 86, by springs whose screws 90 set by adjusting screws 90 which turn in threaded openings in the housing wall. The clutches 72, 74 are set for free rotation clockwise relative to the shell housing 70 as viewed from the left in FIG. 4. The clutches 72, 74 lock with the housing 70 in a counter-clockwise direction relative to the housing.

The embodiment of FIG. 1 uses advantageously dimensional attributes associated with ribboned optical fiber cables. The thickness of such ribboned cable (e.g., 13 to 18 mils) allows many layers to be wound on a reasonably sized spool, which translates to a large number of available rotations. Further, the width of ribboned fiber optic cables (125 to 180 mils) provides spool winding stability and strength, and allows straightforward inter-spool management via the tension wind assembly 40 in FIGS. 1 and 2. By exerting a tension force on a multi-fiber ribbon cable just sufficient to maintain engagement between the cable and the pulley set 46, stresses on the ribbon cable segment 30 during transfer can be maintained at minimal and safe levels, leaving unaffected the transmission characteristics of delicate optic fibers in the cable segment 30.

Figure 5:
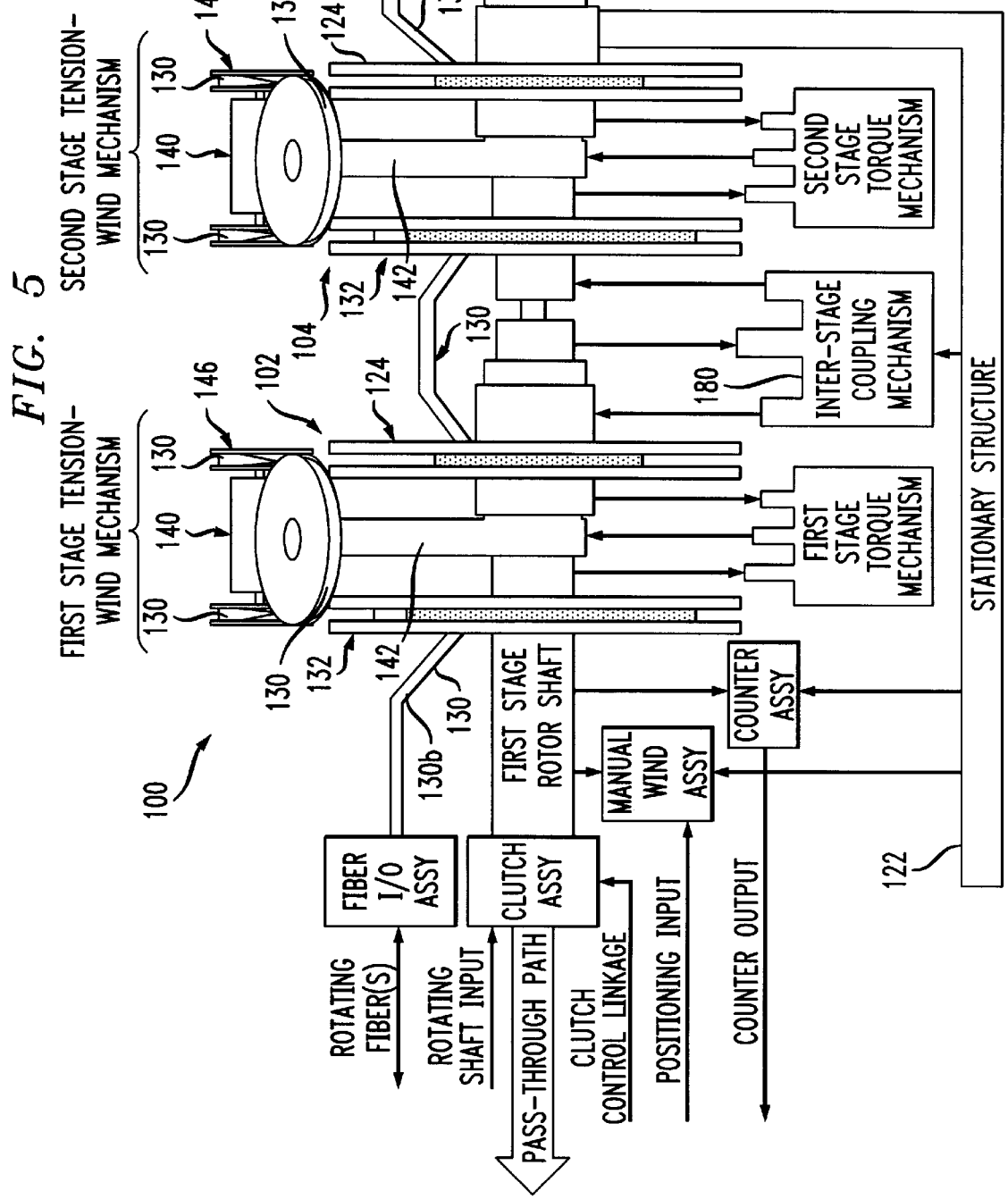
FIG. 5 is a side elevation view of a second embodiment of a cable rotary joint according to the invention.

FIG. 5 is a side elevation view of a second embodiment of a cable rotary joint 100 according to the invention. Parts similar to those disclosed in connection with the embodiment of FIG. 1 have the same reference numerals increased by 100. The cable rotary joint 100 comprises two rotary joint modules 102, 104 each of which is similar to the rotary joint 10 in FIG. 1. Each module has a stator spool 124, a rotor spool 132, and a tension wind assembly 140 including a tension arm 142 and a pulley set 146. The modules 102, 104 are mounted serially in stages along a common axis, and are supported by a stationary spool support 122. Thus, a continuous multi-optical fiber path is provided between a rotating cable drum (not shown in FIG. 5) upstream of a rotating cable segment end 130b of the module 102, and a stationary receiver (not shown) downstream of a fixed cable end 130a of the module 104. By staging the modules 102, 104 serially as in FIG. 5, the maximum number of rotations that can be accommodated by the joint 100 is twice the number that can be handled by one of the modules 102, 104 alone, assuming dimensions of the modules and lengths of the cable segments 130 pre-stored on them are the same for each module.

By serially coupling the stator spool 124 of one module to the rotor spool 132 of a subsequent, downstream module, the number of available rotations can be multiplied by the total number of staged modules. As one module completes a transfer of its ribboned cable segment 130 between its spools in one sense of rotation, the spools preferably lock up with one another and together act to rotate the next downstream stage rotor through a complete spool transfer of its ribboned cable segment 130. Each additional module coupled in this manner will begin rotation after an immediately upstream module completes a transfer of its cable segment 130 between its two spools 124, 132. Thus, the total number of turns for the rotary joint 100 having n identical modules, is n times the number of turns associated with a single module.

Preferably, staging of two or more modules in series is arranged so that the rotor spools 132 are turned proportionally and simultaneously to distribute a total input (cable drum) rotation across all of the modules evenly, with the result that each module reaches an end of its cable segment transfer simultaneously with the other modules. To achieve this, an inter-stage coupling mechanism 180 may be coupled between the spools and shafts of each adjacent pair of modules, and be configured to provide an appropriately geared reduction from each predecessor (upstream) module shaft. Such an arrangement would distribute angular accelerations and velocities evenly across all of the module tension wind assemblies 140. Mechanical response requirements for the tension wind assemblies 140 thus could be eased.

Figure 6:
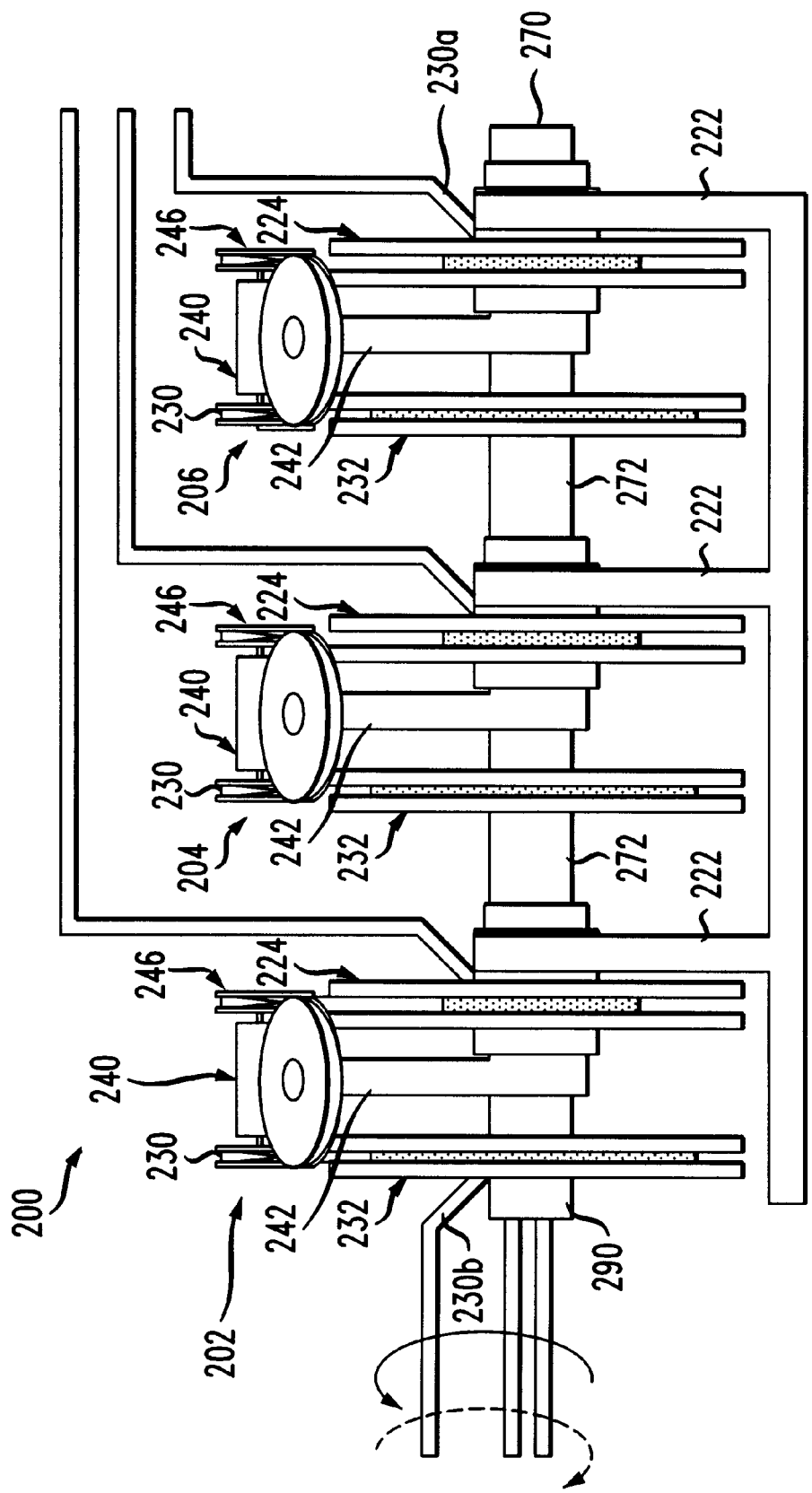
FIG. 6 is a side elevation view of a third embodiment of a cable rotary joint according to the invention.

FIG. 6 is a side elevation view of a third embodiment of a cable rotary joint 200 according to the invention. Parts similar to those of the cable rotary joint 10 in FIG. 1 have the same reference numerals increased by 200. The cable rotary joint 200 in FIG. 6 comprises three rotary joint modules 202, 204, 206. Each of the modules has a stator spool 224, a rotor spool 232, and a tension wind assembly 240 including a tension arm 242 and a pulley set 246. The modules 202, 204, and 206 are mounted on a common, hollow rotor shaft 270 that is supported for rotation by a stator spool support 222.

The cable rotary joint 200 allows the total number of available optical fibers that can pass a rotating interface, to be multiplied by staging the rotor modules 202, 204, and 206 in parallel. Because each of the modules has a hollow center through which other rotating, multi-fiber cables can pass to rotor module stages downstream, such multiplication becomes possible. The hollow center of the common rotor shaft 270 also provides a via for other rotating or non-rotating conductors and shafts, requiring on-axis feed through. While the number of available cable rotations is no more than that allowed by one of the modules, the available rotations can be multiplied by use of serial staging as described in connection with FIG. 5.

In the FIG. 6 arrangement, successive stages are interconnected by couplers 272 which connect the rotor spool 232 of each module to a rotor spool 232 of each downstream module. Thus, the number of fiber optic cables passed through a rotational interface by the rotary joint 200, corresponds to the number of modules comprising the overall joint 200. As mentioned, combination staging can be arranged for a given rotary joint application, wherein modules are configured both to multiply the number of available rotations, and the number of available channels.

The cable rotary joints described herein provide the following important features:

(1) Compensation for rotation between two ends of a length of cable by spooling a continuous segment of a matching cable to/from a rotating spool, from/to an adjacent stationary spool;

(2) Stator and rotor spools each having flanges spaced just wide enough to accommodate a single width of a multi-fiber ribbon cable, thus creating a single, easily managed stack of layered ribbon cable;

(3) Modular constructions by which two or more rotor joint modules can be staged either in series to multiply the number of rotations available with each module alone; and two or more modules can be staged in parallel to multiply the number of multi-fiber cables that can pass a rotating interface; and combinations of series and parallel staging; and (4) A relatively large number of available cable rotations per spool unit volume, by the use of ribboned (i.e., flat), optical fiber cable segments.

It can be shown that a single rotor module could be realized that would tolerate over 1,000 end-to-end cable rotations. Tradeoffs between number of available turns per rotor, versus number of modules stages, can be made to accommodate volume and form requirements flexibly.

Potential applications for the present rotary joint include telemetry links associated with winched cable systems, particularly in undersea use. Such applications include ROV's and towed sensor bodies, and sea floor systems associated with cable embedment, deep ocean mining, salvaging, and sea floor sampling and monitoring. In addition, applications such as winched submarine communication buoys or cable termination swivels, may require optical rotor joints to be installed in a silicon oil filled, pressure compensated housing that is subject to extreme hydrostatic pressures. All components of the present rotary joint, including the tension wind assembly 40 and associated spring-loaded torque mechanism (FIG. 4), are capable of operating reliably in such environments.

While the foregoing description represents preferred embodiments of the invention, it will be obvious to those skilled in the art that various changes and modifications may be made without departing from the true spirit and scope of the invention pointed out by the following claims.

I claim:

1. A cable rotary joint, comprising:

a spool support;

a stator spool mounted on said support and having a spool axis, wherein said stator spool is constructed and arranged to hold a first portion of a cable segment having a first cable end and a second cable end, and to allow the first cable end to connect with a stationary cable interface in a downstream direction from the stator spool;

a rotor spool mounted for rotational movement about the spool axis, wherein the rotor spool is constructed and arranged to hold a second portion of said cable segment, and to allow the second cable end to connect with a rotating cable interface in an upstream direction from the rotor spool;

a tension wind assembly arranged between the stator spool and the rotor spool, wherein the tension wind assembly includes a pulley set for transporting said cable segment from one of said spools to the other in response to rotation of the rotor spool;

said pulley set comprising, a pair of lead pulleys each of which is supported adjacent a circumference of a corresponding one of the stator and the rotor spools and has an axis parallel to the spool axis, wherein each lead pulley leads said cable segment either to wind on or to unwind off an associated spool, and a reversing pulley having an axis in a plane perpendicular to the spool axis and located in relation with said lead pulleys to transfer said cable segment between the lead pulleys; and a torque mechanism coupled to the pulley set for urging the reversing pulley to exert a tensioning force on the cable segment tending to maintain the segment in engagement with the pulley set while the segment is transported by the pulley set between the spools of the rotary joint.

2. A cable rotary joint according to claim 1, wherein said tension wind assembly comprises a tension arm mounted for rotational movement about the spool axis, and said pulley set is fixed at one end of the tension arm.

3. A cable rotary joint according to claim 2, including a counterweight mounted diametrically opposite the pulley set on the tension arm to counter a moment arm created by the pulley set about the spool axis.

4. A cable rotary joint according to claim 1, including a ribbon cable of a certain width forming said cable segment.

5. A cable rotary joint according to claim 4, wherein said stator and said rotor spools each has a pair of flanges that are spaced from one another by an amount just sufficient to accommodate a single width of the ribbon cable.

6. A cable rotary joint according to claim 4, wherein said ribbon cable is a fiber-optic cable.

7. A cable rotary joint according to claim 1, wherein said torque mechanism comprises a cylindrical shell housing, first and second over-running disk clutches in operative relation with an inner periphery of the shell housing at opposite axial ends of the housing, for supporting the housing coaxially about the spool axis, wherein said first clutch is fixed with respect to the spool support, a rotor shaft extending axially through the housing, wherein the rotor shaft is fixed to said second clutch, a tension arm shaft, and an end flange fixed on the tension arm shaft inside the housing, a coil spring having one end fixed to said end flange, and an over-torque relief rotor arranged inside the housing, wherein an opposite end of the coil spring is fixed to said over-torque relief rotor.

8. A cable rotary joint system comprising more than one cable rotary joint according to claim 1, wherein a stator spool of an upstream rotary joint is coupled to a rotor spool of a downstream cable rotary joint.

9. A cable rotary joint system comprising more than one cable rotary joint according to claim 1, wherein the stator spool of each rotary joint is fixed with respect to the spool support, and a rotor spool of an upstream rotary joint is coupled to a rotor spool of a downstream rotary joint.

10. A torque mechanism for use in a cable rotary joint having a stator spool and a rotor spool each supported for rotation about a spool axis, and a tension wind assembly for selectively winding and unwinding a cable segment on and off said spools, the mechanism comprising:

a cylindrical shell housing;

first and second over-running disk clutches in operative relation with an inner periphery of the shell housing at opposite axial ends of the housing, for supporting the housing coaxially about the spool axis, wherein said first clutch is fixed with respect to the stator spool;

a rotor spool shaft extending axially through the housing, wherein the rotor spool shaft is fixed to said second clutch;

a tension wind assembly shaft, and an end flange fixed on the tension wind assembly shaft inside the housing;

a coil spring having one end fixed to said end flange; and an over-torque relief rotor arranged inside the housing, wherein an opposite end of the coil spring is fixed to said over-torque relief rotor.

* * * * *